July 2, 1968 D. E. BIRT ET AL 3,391,397

THIN MAGNETIC FILM STORAGE APPARATUS HAVING ADJUSTABLE INDUCTIVE COUPLING DEVICES

Filed July 14, 1964 4 Sheets-Sheet 3

July 2, 1968 D. E. BIRT ETAL 3,391,397

THIN MAGNETIC FILM STORAGE APPARATUS HAVING ADJUSTABLE INDUCTIVE COUPLING DEVICES

Filed July 14, 1964 4 Sheets-Sheet 4

3,391,397
Patented July 2, 1968

3,391,397

THIN MAGNETIC FILM STORAGE APPARATUS HAVING ADJUSTABLE INDUCTIVE COUPLING DEVICES

David Edward Birt, London, Raymond Frank Sivyer, Sunbury-on-Thames, and Reginald Sidney Webley, Hayes, Middlesex, England, assignors to Electric & Musical Industries Limited, Middlesex, England, a company of Great Britain Filed July 14, 1964, Ser. No. 382,503
Claims priority, application Great Britain, July 16, 1963, 28,091/63; Nov. 15, 1963, 45,135/63
9 Claims. (Cl. 340—174)

ABSTRACT OF THE DISCLOSURE

This specification describes a word organized thin magnetic film matrix store arranged in a plurality of planes and having pairs of digit and sense conductors which are reverse looped relatively to one another to tend to cancel the coupling between them at a plurality of points along each sense conductor, and including a plurality of inductive coupling devices which are adjustable or have been adjusted to improve the cancellation at several points along each sense conductor. The coupling devices include moveable screens between the conductors or means for adjusting the spacing between or length of the go and return portions of the conductors to effect adjustment of the coupling.

Figure 1:
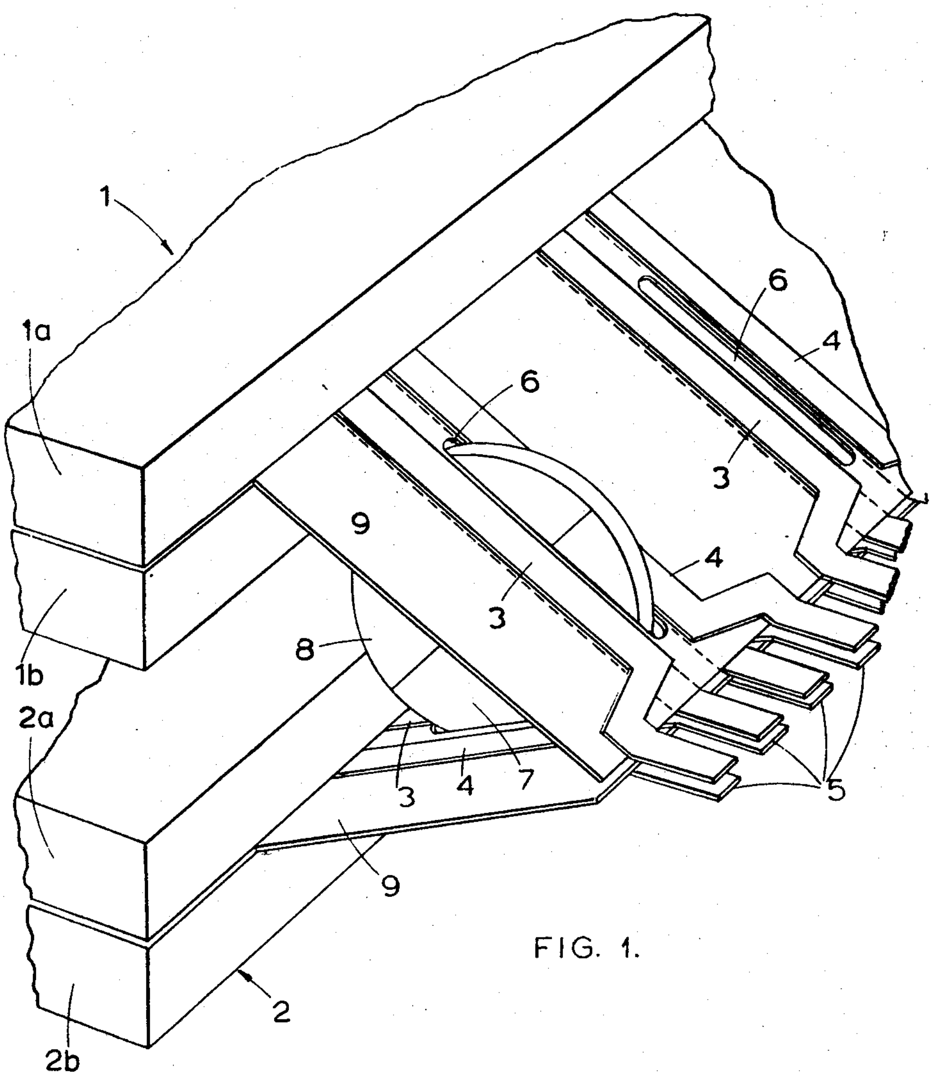

This invention relates to storage devices having a plurality of storage elements and is particularly, although not exclusively, applicable to thin film stores.

In a storage device having a matrix of thin magnetic film storage elements and sense and drive conductors coupled with said elements in groups it has been found that coupling between sense and drive conductors causes spurious impulses to be set up in the sense conductors which may impede the sensing operation. In one form of store, called a word organized store, the storage elements are distributed in several planes and the drive conductors are constituted by a set of address conductors and a set of digit conductors, the address conductors and the digit conductors being perpendicular where they cross the planes of storage elements. The sense conductors are moreover parallel to the digit conductors. Mutual inductance may exist therefore between the sense and digit conductors. In operation of such a store, as is well known in the art, sensing is effected at the time of application of an address pulse to one address conductor which produces a rotation of the magnetization vector of the elements in a selected row or "address" in one plane, signals being subsequently applied to the digit conductors to reset the elements according to the digit signals. As address conductors are disposed at right angles to the sense conductors there is no acute problem of mutual inductance between these conductors, and it might be thought that any spurious signal induced in the sense conductors by the digit signals would not disturb the operation of the store since the sensing operation which is initiated by the address pulse is completed before the digit signals are applied. However, spurious energy induced in the sense conductors by the digit signals is large in amplitude compared with that induced by wanted signals during sensing and paralyzes the sense amplifiers for some time and a further sensing operation cannot be performed until this paralysis has subsided. Thus the interval between successive sensing operations called the "access time" may have to be greater than need be. To reduce this problem it has been proposed to reduce the mutual inductance between the sense and digit conductors in a word organized store of multi-plane construction by means of a variable inductance provided at one or the other end of the digit or sense conductors of the store. Moreover, it has also been proposed to arrange the digit and sense conductors of such a store so that a reverse loop occurs in the conductor of one set between adjacent planes of the store. Both of these methods serve to reduce the effect of mutual inductance between the digit and sense conductors. However it has been found that these expedients have not enabled the access time to be reduced as much as would have been thought possible.

The object of the invention is to provide an improved storage device with a view to enabling reduced access times to be achieved.

According to the present invention there is provided an information storage device including thin film magnetic material disposed on supporting means and forming storage elements, a plurality of address conductors each disposed so as to be magnetically coupled to a respective group of said storage elements, a plurality of digit conductors each disposed so as to be magnetically coupled to a respective storage element in each of said groups, a plurality of sense conductors, each corresponding to a respective digit conductor and disposed so as to be magnetically coupled to the same storage elements, wherein the mutual coupling between each of said digit conductors and the corresponding sense conductor is in opposite senses in different parts of the device so that the total coupling is substantially nullified at several points along each digit conductor and the corresponding sense conductor, there being provided for each of said digit conductors a respective plurality of trimming devices coupling the digit conductor to the respective sense conductor, each for one of said points, said trimming devices being adjustable or having been adjusted to reduce further the coupling between the digit and sense conductors at said points.

The present invention is based on the experience of the inventors that if a very short access time is required, it is insufficient, in the case of a word organized store, merely to cancel the overall mutual inductance between the sense and digit conductors of every pair of such conductors. In accordance with the practice which has been proposed hitherto, coarse cancellation of the mutual inductance is achieved by reverse looping one of each pair of conductors relative to the other between adjacent planes and any overall residual mutual inductance is minimized by the variable mutual inductance provided at the end of each pair of conductors. The difficulty arises because in a multi-plane store, the transit time for a pulse from one end of the digit conductor to the other is appreciable and may be comparable with the length of the digit pulse. For example the transit time may be about 30 nanoseconds whereas the digit pulse duration may be about 300 nanoseconds and the digit pulse, or portions of it may induce signals in different parts of the sense conductors which are not mutually cancelling. For example the leading and trailing parts of a pulse may induce spurious signals independently in different planes which are liable to interfere with the next sensing operation. However by virtue of the invention provision is made for reducing the tendency for spurious signals to be induced within the store since the mutual inductance or other coupling between conductors can be minimized by adjustment of the trimming devices after the conductors are assembled in position.

The invention is therefore especially applicable to storage devices in which means are provided for applying pulses to one of said conductors which pulses have a duration comparable with the transit time of the pulse along said conductor through said storage device. The word "comparable," as used herein and in the claims, is to be taken to mean within the same order or an adjacent order.

Figures 2, 3:
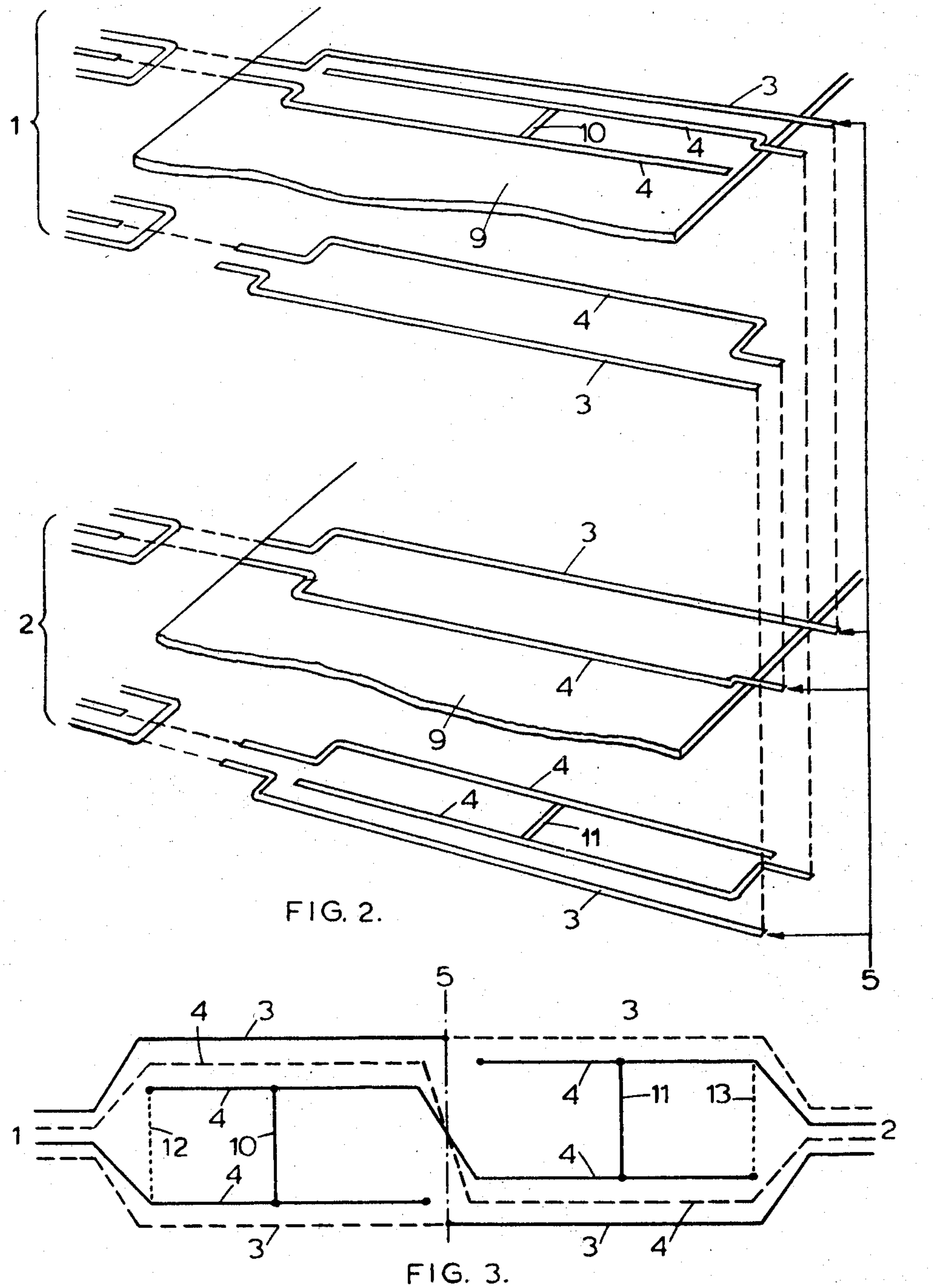
Figure 4:
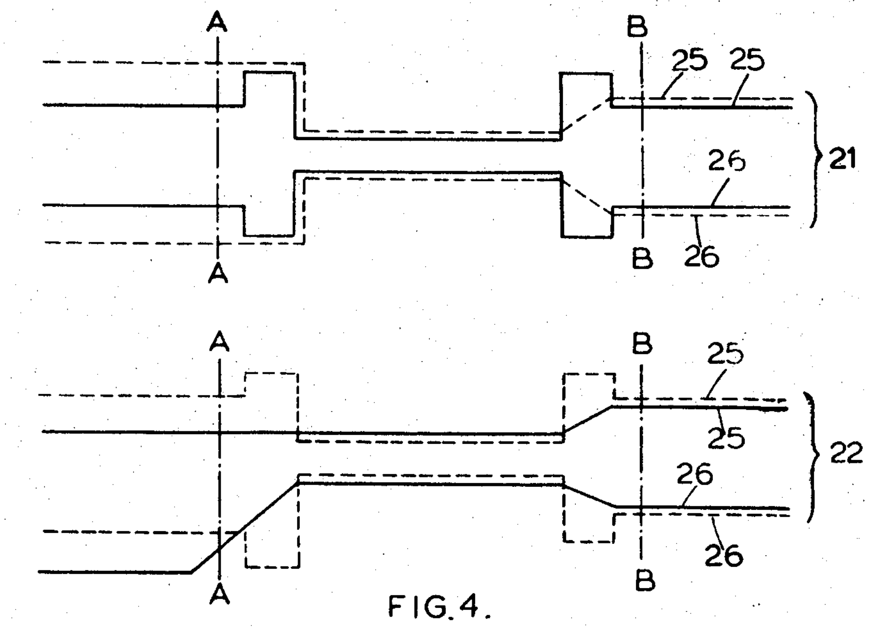
Figure 5:
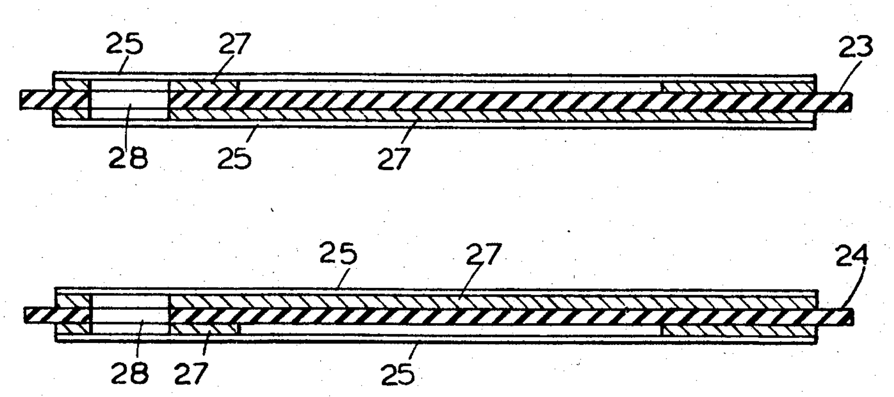
Figure 6:
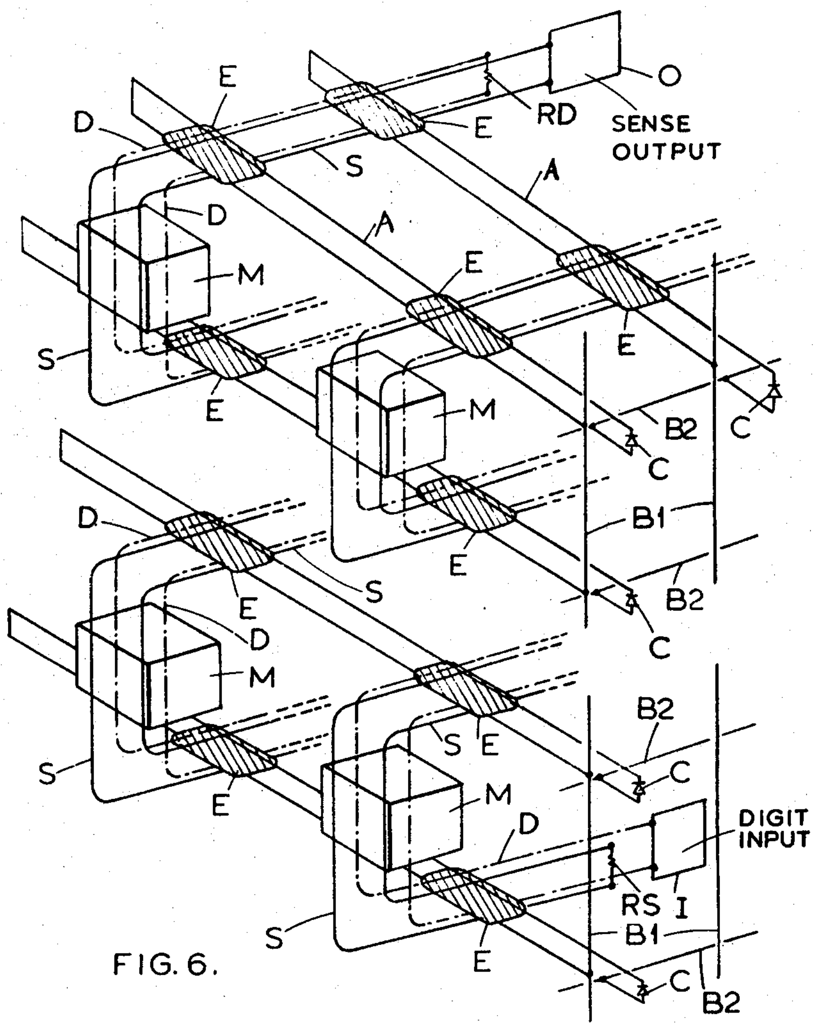

In order that the invention may be clearly understood and readily carried into effect it will now be described with reference to the accompanying drawings, of which:

FIGURE 1 shows the interconnection of conductors associated with two memory planes of a thin film store, and a device for trimming the mutual inductance between said conductors in accordance with a first embodiment of the invention, FIGURE 2 shows an alternative form interconnection of conductors associated with a pair of memory planes in a thin film store and means for trimming the mutual inductance between said conductors according to a second embodiment of the invention, FIGURE 3 shows the arrangement of FIGURE 2 in planar form, so that the method of adjusting mutual inductance may be more easily appreciated, FIGURE 4 is a diagrammatic plan view of yet another form of interconnections for the conductors associated with an adjacent pair of memory planes according to a further embodiment of the invention, FIGURE 5 is a sectional view of the interconnections of FIGURE 4, and FIGURE 6 is a phantom diagram showing the organization of the conductors in four planes of a word organized thin film store.

A four plane store is described and shown for simplicity in FIGURE 6, but the store may have more than four planes, for example it may be a sixteen plane store. This figure gives an indication of the overall construction of the thin film word organized store to which the various forms of trimming devices illustrated in FIGURES 1 to 5 may be applied. The store assuming only four planes comprises two hundred and fifty-six rows of thin film magnetic elements, sixty-four rows to each of four planes, and there are fifty elements in each row. In the drawing only four elements are shown in the uppermost plane, two in each of two rows, and only two elements in one row are shown in each of the remaining planes, the elements being denoted by reference E. Each row of elements provides storage capacity for one word and, the store being a word organized store, and each row of magnetic elements is coupled with an address conductor A. Each address conductor A may be a two turn conductor although only one turn is shown in the drawing for simplicity, and one end of each address conductor A is coupled to a vertical bus-bar B1, each bus-bar B1 being common to two corresponding address conductors A of two planes. The other end of each address conductor A is coupled to a horizontal bus-bar B2 via a diode C, there being two bus-bars B2 for each plane. There is a separate address winding A for every row on each plane and there are thirty-two vertical bus-bars B1 and four pairs of horizontal bus-bars B2. A particular row (word location) in any one plane can be addressed by applying an appropriate potential difference between a selected vertical bus-bar B1 and a selected horizontal bus-bar B2. Any suitable address selecting circuit may of course be used.

Each of the elements E is also associated with two further conductors, namely a digit conductor D and a sense conductor S. These conductors are associated with the magnetic elements in column and in the drawing sense conductors S are shown in full lines whilst digit conductors D are shown in dot-dash lines to assist in discriminating between them. The same sense and digit conductors couple with corresponding elements E in the four planes. Thus there are fifty digit conductors D and fifty sense conductors S each of which zig-zags from one plane to the next as can been from the drawing. The magnetic elements E are in the form of discrete thin magnetic film elements which are uniaxially anisotropic. They are roughly rectangular in shape having their longer dimensions aligned with the direction of the rows. The magnetic anisotropy is such as to produce a characteristic hysteresis loop which ideally approximates to a rectangle along axes which are aligned with the rows of the store, and substantially no hysteresis along axes aligned with columns. In practice each digit conductor D may be composed of two parallel conductors lying respectively at opposite sides of the conductor which constitutes the respective sense conductor S but in order to simplify FIGURE 6 only one of the digit conductors is shown.

As can be seen in the drawing each sense and digit conductor is provided in the form of a loop coupled respectively to mean O for deriving a sense output and means I for applying a digit input. Each sense and digit conductor loop is terminated by a resistance respectively indicated by references RS and RD. Between each pair of adjacent planes of elements E the digit conductor D and sense conductors S are arranged so that a cross-over occurs in the respective positioning of these conductors. Thus as can be seen in the drawing each sense conductor is reverse looped so as to alternate between lying above and below elements on consecutive planes whereas each digit conductor is arranged to lie above every element in the first half of its loop and below every element in the second half of its loop or vice versa.

In accordance with an embodiment of this invention at each cross over position between each pair of adjacent planes of the store trimming means M are provided shown diagrammatically as a block in each case for trimming the coupling between the digit conductor and sense conductor in every pair of such conductors. Although only a part of one side of the store is shown in FIGURE 6 it will be appreciated that the arrangement of conductors and trimming means M will be similar over the whole of that side of the store. On the other side of the store the sense conductors are again reverse looped but no trimming means M are provided. Although in this embodiment trimming means M are provided for every pair of planes of the store, fewer trimming means M may be adequate to achieve the desired adjustment. Specific embodiments of the trimming means M will be described in greater detail hereinafter with reference to the other figures of the drawings.

The mode of operation of the storage device described is well known to those skilled in the art and will not be described in detail, the invention being primarily concerned with the provision of the trimming means M for adjusting the mutual inductance between sense and digit conductors, within the store. A more detailed description of the construction and operation of a store such as represented in FIGURE 6 can be found in the United States patent application Ser. No. 226,863.

One embodiment of the timing means M is shown in FIGURE 1. In this figure reference numerals 1 and 2 indicate two adjacent memory planes of a multiplane thin film store of the general construction described in connection with FIGURE 6. In this particular embodiment the digit and sense conductors of each plane are formed by printed conductors adherent on the facing surfaces of two supports, fragments of which are indicated. Address conductors are not visible in FIGURE 1, and the thin film storage elements are provided on a thin substrate which also is not visible but is sandwiched between said two supports. The supports of one plane bear the references 1*a* and 1*b* and the supports of the other plane bear the references 2*a* and 2*b*. The digit and sense store conductors of adjacent planes are coupled together in the manner already described with reference to FIGURE 6 employing digit and sense connecting portions respectively indicated by references 3 and 4 in FIGURE 1, and which are printed on the upper and lower sides of insulated boards 9, and coupled together at point 5, so as to provide the required cross-over in the respective positionings of the digit and sense conductors in the planes 1 and 2. In this embodiment of the invention the trimming means M comprise slots 6 cut in the boards 9 between pairs of connectors 3 and 4, the boards 9 being inclined towards one another as shown, and insulated discs 7 (only one of which is shown) are respectively introduced into corresponding pairs of slots 6. The discs 7 are half coated, as shown, with a conductive coating or foil 8 and may be rotated about their axes so that by rotating each disc the total mutual coupling between the digit and sense conductors of the pair of storage planes such as 1 and 2 may be adjusted from a positive to a negative value. Coarse cancellation of the mutual inductance for the pair of planes is of course achieved by the reverse looping aforesaid. When the position of the discs is such that the mutual coupling between the digit and sense conductors in the planes 1 and 2 is cancelled then the disc is cemented into position. Several variations of this arrangement will at once be apparent to one skilled in the art. For example the disc may be replaced by a single vertical sliding strip of conductive material, or a pair of horizontal sliding strips can be provided.

In FIGURE 2 the same reference numerals are used to indicate components which are common to FIGURES 1 and 2. The insulated boards 9 again carry the digit and sense connectors 3 and 4 which are printed with adjustable loops and means for achieving a crossover between the digit and the sense conductors of planes 1 and 2. The conductors adherent to the lower surfaces of the boards 9 are shown removed to a distance for clarity. The coupling loops are printed on the top of the upper board 9 and the bottom of the lower board 9 so that the coupling loops are accessible when the store is assembled. Bridge means in the form of shorting bars 10 and 11 are applied across the loops and may be moved along the loop in order to adjust the coupling between the sense and digit connectors 4 and 3 so that the coupling between the sense and digit conductors in the planes 1 and 2 can be balanced. When balance has been achieved the shorting bars are soldered securely into place or replaced by a bridge of solder. This arrangement offers a fine cancellation and the coarse cancellation is obtained by the reverse looping arrangement of the conductors produced by the soldered joints at 5. FIGURE 3 shows diagrammatically the effect of unfolding the boards 9 so that the bars 10 and 11 are on the same side of both boards. If the shorting bars 10 and 11 are moved to the position indicated by the dotted positions 12 and 13 then the coupling loops are small and little correction is obtained. However if either of the coupling bars 10 or 11 is moved from the dotted position 12 or 13 towards the interconnections 5 the cancellation signal is increased.

In yet another embodiment of the invention either the digit or sense connector may, instead of being provided entirely as an adhering conductor on an insulating support, be detached from the board for a part of its length. The detached part is adjustable in position so that its distance from the board can be varied to adjust the inductive coupling between it and the other respective connector. The detached part is then secured in a suitable manner in its adjusted position.

One example of this embodiment is shown in FIGURES 4 and 5 in which the digit and sense connectors for two adjacent memory planes of the store are shown in plan view in FIGURE 4 and in section in FIGURE 5. This reference 21 indicates generally a digit and sense connector for one plane, whilst reference 22 indicates generally a digit and sense connector for the next plane, the connectors 21 and 22 being, in practice, coupled together at the left hand side of the figures. The connectors 21 and 22 are each provided on an insulating support shown only in FIGURE 5, the support for the connectors 21 being denoted by the reference 23 whilst the support for the connectors 22 is denoted by the reference 24. The supports 23 and 24 carry on their upper and lower surfaces the digit connectors 25, and sense connectors 26 which at their right hand ends are respectively coupled to the digit and sense conductors of the two planes of the store. In FIGURE 4 the portions of the connectors 25 and 26 on the upper surfaces of the supports 23 and 24 are indicated by full lines whereas the portions of conductors on the lower surfaces of said supports 23 and 24 are indicated by dotted lines. As in the previously described embodiments the connectors 25 and 26 are coupled together in such a way that a cross-over occurs in the respective positioning of the digit and sense conductors of the two planes of the store. By reason of the cross-over aforesaid the sign of a signal induced in a sense conductor due to a signal in the adjacent digit conductor is opposite in the two planes. In the embodiment illustrated the forward and return sense connectors 26 are arranged to cross between the two supports 23 and 24, i.e., the upper connector 26 on support 23 is connected to the lower connector 26 on support 24 whilst the lower connector 26 on support 23 is connected to the upper connector 26 on support 24. On the other hand the upper digit connector 25 on both the supports 23 and 24 are connected together and likewise the lower digit connectors 25 on both supports are connected together. In order to adjust the coupling between the sense and digit connectors it is arranged that the separations between forward and return portions of the digit connectors 25 and sense connectors 26 on opposite sides of each support 23 and 24 are adjustable to vary the coupling between the connectors 25 and 26 so that the aforesaid coupling in the planes can be compensated for.

In an arrangement in which forward and return portions of the digit connectors 25 are secured on opposite sides of a support these portions are so close together that the forward and return signals almost cancel and so the coupling with the sense connectors 26 is very low. By way of example this coupling may be about 5%. By increasing the separation between said portions of the digit connectors, however, the magnetic field in the region of the sense connectors is considerably increased and if the separation between the corresponding portions of the sense connectors is also suitably large a current is induced in the sense connector which can be arranged to cancel any current induced in the planes of the store. The sense of the induced current depends upon whether the upper or lower connectors are moved, whilst the magnitude of the induced current depends upon the separations between the respective forward and return portions of connectors. By way of example an increase in separation of 0.020 in. has been found to increase the respective coupling to about 50%.

In a practical arrangement of the embodiment of the invention illustrated in FIGURES 4 and 5 a section of the forward portions of connectors 25 and 26 on support 23 and a section of the return portions of connectors 25 and 26 on support 24 are not secured to the respective supports. These sections lie between the dot-dash lines AA and BB in FIGURE 4 and the connector sections which are not secured to the supports are shaped as shown in FIGURE 4 to reduce mechanical strain on them. The unsecured sections of connectors are adjusted in position until the required degree of coupling is achieved. For example the adjustment can be made whilst observing the induced signal on an oscilloscope. When a required position of the connectors is achieved this can be retained by embedding the adjusted connector sections in molten wax or a potting resin.

In manufacturing the arrangement described and shown, by way of example an adhesive coated supporting sheet of copper may be employed, the adhesive being indicated by reference 27 in FIGURE 5. A section of adhesive 27 corresponding to the required unsecured section of connector is then removed such as with boiling chromic acid, the remaining areas of adhesive 7 being masked, for example with pressure sensitive Terylene tape. The exposed copper is then coated, such as by electroplating, with a thin film of silver to prevent subsequent attacking of said exposed copper by copper etchant. The copper sheet is then bonded to the support 23 or 24 and the connectors 25 and 26 are produced from it by masking areas required for said connectors with a photoresist and etching with ferric chloride to remove intermediate areas of copper. The silver film together with any coating of silver chloride formed during the etching is then removed with a solution of iodine in potassium iodide or with Farmer's solution. The construction of the interconnectors is then as shown in section in FIGURE 5, a window 28 being left in each support for soldering purposes to make the joins between different planes.

Although the invention has been particularly described with reference to specific embodiments thereof as illustrated in FIGURES 1 to 5 of the drawings, modifications of these embodiments may be made within the scope of the invention. For example in a modification of the embodiment of FIGURES 4 and 5 forward and return sections of only one connector may be adjustable in separation, or both such sections may be left unconnected. It will be appreciated that in the interconnectors there will be many sets of conductors such as 25 and 26 lying side by side and adhering to the surfaces of common supports 23 and 24 there being one set for each column of the storage elements.

What we claim is:

1. An information storage device including thin film magnetic material disposed on supporting means and forming storage elements, a plurality of address conductors each disposed so as to be magnetically coupled to a respective group of said storage elements, a plurality of digit conductors each disposed so as to be magnetically coupled to a respective storage element in each of said groups, a plurality of sense conductors, each corresponding to a respective digit conductor and disposed so as to be magnetically coupled to the same storage elements, wherein the magnetic coupling between each of said digit conductors and the corresponding sense conductor is in opposite senses in different parts of the device so that the total coupling is substantially nullified at several points along each digit conductor and the corresponding sense conductor, there being provided for each of said digit conductors a respective plurality of trimming devices coupling the digit conductor to the respective sense conductor, each for one of said points, said trimming devices being individually adjustable to reduce further the coupling between the digit and sense conductors at said points.

2. An information storage device including thin film magnetic material disposed on supporting means and forming storage elements, a plurality of address conductors each disposed so as to be magnetically coupled to a respective group of said storage elements, a plurality of digit conductors each disposed so as to be magnetically coupled to a respective storage element in each of said groups, a plurality of sense conductors, each corresponding to a respective digit conductor and disposed so as to be magnetically coupled to the same storage elements, wherein the mutual coupling between each of said digit conductors and the corresponding sense conductor is in opposite senses in different parts of the device so that the total coupling is substantially nullified at several points along each digit conductor and the corresponding sense conductor, there being provided for each said digit conductors a respective plurality of trimming devices coupling the digit conductor to the respective sense conductor, each for one of said points, said trimming devices being individually adjusted to reverse further the coupling between the digit and sense conductors at said points.

3. A storage device according to claim 2 comprising means for selectively applying to said digit conductors pulses having durations comparable with the transit times of said pulses along said digit conductors through said device.

4. A storage device according to claim 2 in which said storage elements are arranged in a plurality of pairs of memory planes and for each digit conductor and associated sense conductor a trimming device is provided for each of said pairs of planes.

5. A storage device according to claim 2 in which each said trimming device comprises a conductive part interposed between adjacent portions of a digit conductor and the corresponding sense conductor for a selected length of said last mentioned conductors so as to adjust the mutual inductance therebetween.

6. A storage device according to claim 2 in which each said trimming device comprises means which determines the length of a portion of one of said digit or sense conductors which lies close to the corresponding sense or digit conductor.

7. A storage device according to claim 6 in which each said digit or sense conductor is provided with two substantially parallel portions and bridge means coupling said parallel portions together.

8. A storage device according to claim 2 in which each said trimming device comprises means in which the position of a portion of one of said digit or sense conductors is adjusted to determine the mutual inductance between said digit and sense conductors.

9. A storage device according to claim 8 in which said conductor of which the position is adjusted is a printed conductor on an insulating subtrate with said portion detached from said substrate and positioned at a selected distance from the substrate.

References Cited

UNITED STATES PATENTS

| | | | |
|---|---|---|---|
| 2,900,624 | 8/1959 | Stuart-Williams et al. | 340—174 |
| 3,000,004 | 9/1961 | Weller | 340—174 |
| 3,055,770 | 9/1962 | Sankwer et al. | 117—71 |
| 3,142,049 | 7/1964 | Crawford | 340—174 |
| 3,181,131 | 4/1965 | Pryor et al. | 340—174 |
| 3,181,132 | 4/1965 | Amemiya | 340—174 |
| 3,298,005 | 1/1967 | Matick | 340—174 |
| 3,325,793 | 6/1967 | Simkins et al. | 340—174 |

BERNARD KONICK, *Primary Examiner.*

STANLEY URYNOWICZ, *Examiner.*